United States Patent
Azuma

(10) Patent No.: US 7,130,955 B2
(45) Date of Patent: Oct. 31, 2006

(54) MICROPROCESSOR AND VIDEO/SOUND PROCESSING SYSTEM

(75) Inventor: Tetsuhiko Azuma, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 226 days.

(21) Appl. No.: 10/718,591

(22) Filed: Nov. 24, 2003

(65) Prior Publication Data

US 2005/0060483 A1    Mar. 17, 2005

(30) Foreign Application Priority Data

Sep. 2, 2003    (JP) ............................. 2003-310128

(51) Int. Cl.
*G06F 13/00* (2006.01)
(52) U.S. Cl. .................................... 710/316
(58) Field of Classification Search ............... 710/316; 712/201
See application file for complete search history.

(56) References Cited

U.S. PATENT DOCUMENTS

| | | | | |
|---|---|---|---|---|
| 4,378,591 A | * | 3/1983 | Lemay | 711/3 |
| 4,484,273 A | * | 11/1984 | Stiffler et al. | 710/110 |
| 4,845,664 A | * | 7/1989 | Aichelmann et al. | 711/105 |
| 5,107,415 A | * | 4/1992 | Sato et al. | 712/300 |
| 5,148,161 A | * | 9/1992 | Sako et al. | 341/93 |
| 5,265,237 A | * | 11/1993 | Tobias et al. | 710/65 |
| 5,297,231 A | * | 3/1994 | Miller | 704/201 |
| 5,721,957 A | * | 2/1998 | Huang et al. | 710/66 |
| 5,742,840 A | * | 4/1998 | Hansen et al. | 712/210 |
| 5,828,853 A | * | 10/1998 | Regal | 710/315 |
| 6,243,808 B1 | * | 6/2001 | Wang | 712/300 |
| 6,430,664 B1 | * | 8/2002 | Chauvel et al. | 711/168 |
| 6,725,369 B1 | * | 4/2004 | Farmer et al. | 713/100 |

FOREIGN PATENT DOCUMENTS

| | | |
|---|---|---|
| JP | 11-45212 | 2/1999 |
| JP | 11-175404 | 7/1999 |
| JP | 2001-230770 | 8/2001 |

* cited by examiner

*Primary Examiner*—Paul R. Myers
(74) *Attorney, Agent, or Firm*—Oblon, Spivak, McClelland, Maier & Neustadt, P.C.

(57) ABSTRACT

An aspect of the present invention provides a microprocessor that includes a processor core including an instruction executing unit configured to execute instructions for input and output controlling and processing for data and a cache memory configured to store the data, a memory management unit coupled to the processor core, the memory management unit configured to manage memory system including the cache memory, and a bus interface coupled to the processor core and the memory management unit, the bus interface configured to rearrange the bits of the data transferred from the processor core.

16 Claims, 10 Drawing Sheets

| | 31 | 30 | 29 | 28 | | 03 | 02 | 01 | 00 |
|---|---|---|---|---|---|---|---|---|---|
| PRE ROUTING | 0x07 | 0x13 | 0x00 | 0x0E | ······ | 0x12 | 0x01 | 0x06 | 0x09 |

FIG. 7

| BUS SWITCH CONTROL | | | | | | BUS SWITCH | | | |
|---|---|---|---|---|---|---|---|---|---|
| HEXADECIMAL | BINARY | | | | | A | B | C | D |
| 0x00 | 0 | 0 | 0 | 0 | 0 | E | F | G | H |
| 0x01 | 0 | 0 | 0 | 0 | 1 | E | F | H | G |
| 0x02 | 0 | 0 | 0 | 1 | 0 | E | G | F | H |
| 0x03 | 0 | 0 | 0 | 1 | 1 | E | G | H | F |
| 0x04 | 0 | 0 | 1 | 0 | 0 | E | H | F | G |
| 0x05 | 0 | 0 | 1 | 0 | 1 | E | H | G | F |
| 0x06 | 0 | 0 | 1 | 1 | 0 | – | – | – | – |
| 0x07 | 0 | 0 | 1 | 1 | 1 | – | – | – | – |
| 0x08 | 0 | 1 | 0 | 0 | 0 | F | E | G | H |
| 0x09 | 0 | 1 | 0 | 0 | 1 | F | E | H | G |
| 0x0A | 0 | 1 | 0 | 1 | 0 | F | G | E | H |
| 0x0B | 0 | 1 | 0 | 1 | 1 | F | G | H | E |
| 0x0C | 0 | 1 | 0 | 1 | 0 | F | H | E | G |
| 0x0D | 0 | 1 | 0 | 1 | 1 | F | H | G | E |
| 0x0E | 0 | 1 | 1 | 1 | 0 | – | – | – | – |
| 0x0F | 0 | 1 | 1 | 1 | 1 | – | – | – | – |
| 0x10 | 1 | 0 | 0 | 0 | 0 | G | E | F | H |
| 0x11 | 1 | 0 | 0 | 0 | 1 | G | E | H | F |
| 0x12 | 1 | 0 | 0 | 1 | 0 | G | F | E | H |
| 0x13 | 1 | 0 | 0 | 1 | 1 | G | F | H | E |
| 0x14 | 1 | 0 | 0 | 1 | 0 | G | H | E | F |
| 0x15 | 1 | 0 | 0 | 1 | 1 | G | H | F | E |
| 0x16 | 1 | 0 | 1 | 1 | 0 | – | – | – | – |
| 0x17 | 1 | 0 | 1 | 1 | 1 | – | – | – | – |
| 0x18 | 1 | 1 | 0 | 0 | 0 | H | E | F | G |
| 0x19 | 1 | 1 | 0 | 0 | 1 | H | E | G | F |
| 0x1A | 1 | 1 | 0 | 1 | 0 | H | F | E | G |
| 0x1B | 1 | 1 | 0 | 1 | 1 | H | F | G | E |
| 0x1C | 1 | 1 | 0 | 1 | 0 | H | G | E | F |
| 0x1D | 1 | 1 | 0 | 1 | 1 | H | G | F | E |
| 0x1E | 1 | 1 | 1 | 1 | 0 | – | – | – | – |
| 0x1F | 1 | 1 | 1 | 1 | 1 | – | – | – | – |

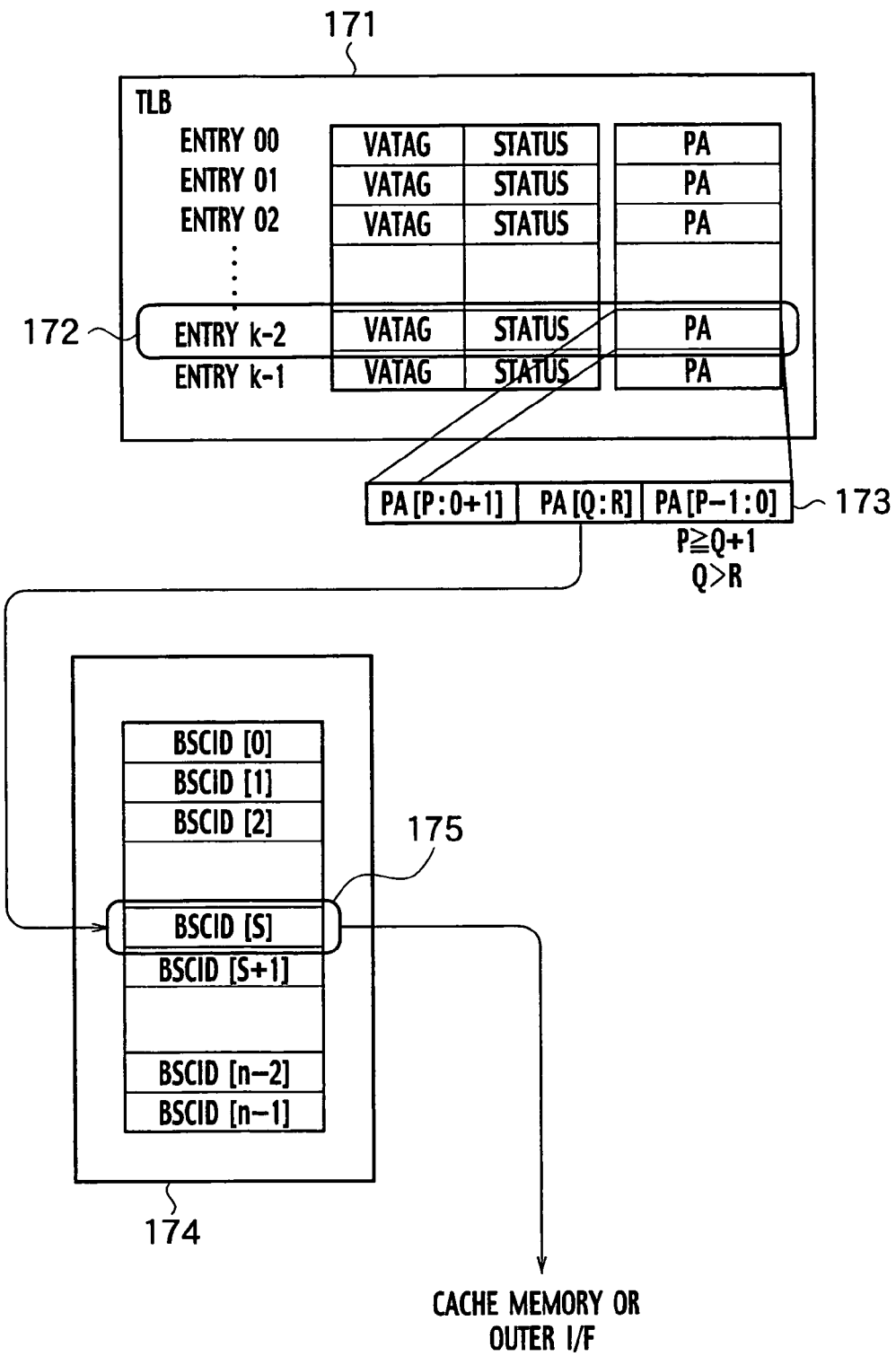

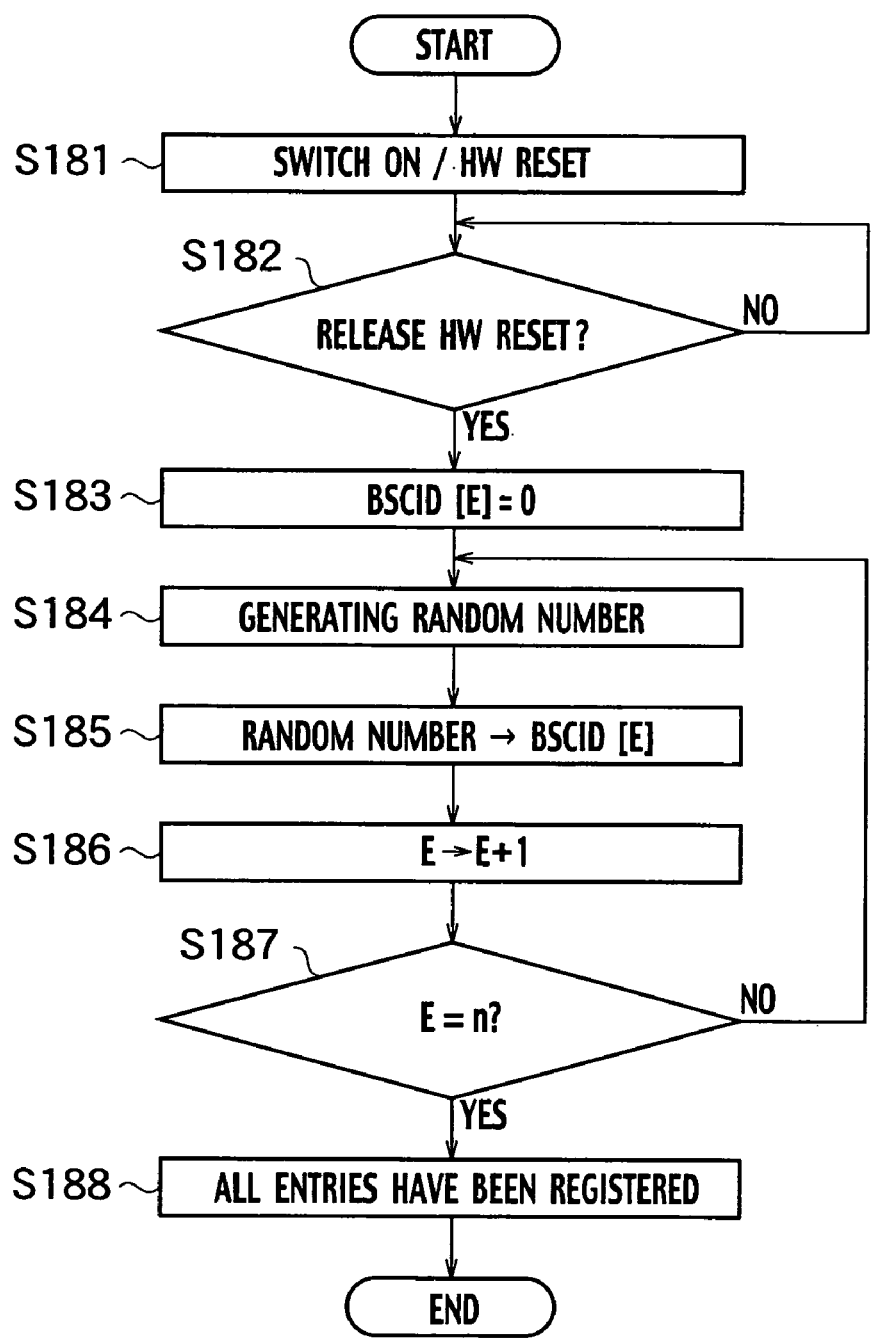

MICROPROCESSOR AND VIDEO/SOUND PROCESSING SYSTEM

CROSS REFERENCE TO RELATED APPLICATIONS

This application is based upon and claims the benefit of priority from the prior Japanese Patent Application No. P2003-310128 filed on Sep. 2, 2003, the entire contents of which are incorporated herein by reference.

BACKGROUND OF THE INVENTION

1. Field of the Invention

The present invention relates generally to a microprocessor and a video/sound processing system, and more particularly, to a technology that provides high-level protection for the content of media at low cost.

2. Description of Related Art

Currently, devices that handle video, sound, and other content are provided with a microprocessor or a dedicated LSI for playing back video and/or sound information. Video, sound, and other data (hereinafter called "content") are often stored on such physical media as optical disks and such magnetic recording devices as hard disk drives (HDD). In recent years, most of the video and voice information stored on optical disks and magnetic recording devices is treated with encryption or the like using a special method for the purpose of copyright protection. Since the content stored in recording devices like those just mentioned has been treated for protection and security, persons who might attempt to misuse the stored data and play it back on another device will generally be unable to easily break the security. However, if an analytical hint is available, it is possible for the security to be broken easily by conducting data processing on a computer.

Information that constitutes an analytical hint exists in the unit where the data is ultimately processed, i.e., in the vicinity of the microprocessor or dedicated LSI. That is where the encrypted information is decrypted and translated into the original information. Much of the decrypted and converted information is stored in a memory, e.g., a random access memory (RAM), connected to the processor or dedicated LSI that executes the data processing. In such a case, an analytical hint can be obtained by using a test device to measure the signal of the RAM itself and analyzing the data. The information from the analysis can then be used as a starting point for breaking the security.

Conventional technologies for handling this issue have included combining the processor and the memory into one chip in order to conceal the bus of the memory and silk printing a different model number on the IC package so that the identity of the processor will be unknown.

Meanwhile, a disclosed conventional method of resisting illicit decryption of secret information is a technology in which a means is provided for randomly changing secret information when writing to a volatile memory that stores secret information after it has been translated, the converting means converts and stores the secret information in different places each time the secret information is written to the volatile memory and also in different places of each electronic device in which the technology is used. (See Japan Patent Office Publication (Kokai) HEI-11-45212 (FIG. 1).)

In another disclosed technology, the bus interface unit inside a microprocessor is provided with an address translating means that converts virtual addresses into physical addresses and a memory reading means that reads the content corresponding to physical addresses designated by a memory external to the microprocessor. An instruction TLB stores a table that includes an address conversion rule and one or more entries having encryption attribute information in ranges designated by the virtual addresses. (See Japan Patent Office Publication (Kokai) 2001-230770 (FIG. 5).)

The conventional methods just described require specialized components to be manufactured and make it extremely difficult to reduce costs. In most cases, general-purpose memories are used in order to reduce the cost of the system. However, the use of general-purpose memories is a problem because it is possible for the signal line connected to the memory and the function of that signal line to be readily ascertained.

SUMMARY OF THE INVENTION

An aspect of the present invention provides a microprocessor that includes a processor core including an instruction executing unit configured to execute instructions for input and output controlling and processing for data and a cache memory configured to store the data, a memory management unit coupled to the processor core, the memory management unit configured to manage memory system including the cache memory, and a bus interface coupled to the processor core and the memory management unit, the bus interface configured to rearrange the bits of the data transferred from the processor core.

Another aspect of the present invention provides a video/sound processing system that includes a storage device configured to store content, a bridge coupled to the storage device, the bridge configured to transfer the content stored by the storage device, a microprocessor that includes a processor core including an instruction executing unit configured to execute instructions for input and output controlling and processing for the content and a cache memory configured to store the content, a memory management unit coupled to the processor core, the memory management unit configured to manage memory system including the cache memory, and a bus interface coupled to the processor core and the memory management unit, the bus interface configured to rearrange the bits of the content transferred from the processor core, a memory coupled to the bridge, the memory configured to temporally hold the rearranged content from the micro processor, a D/A converter coupled to the memory, the D/A converter configured to convert the transferred content to analog data.

BRIEF DESCRIPTION OF THE DRAWINGS

FIG. 7 is a table showing the correspondence between the bus switch connection schemes and the bus switch control information parameters.

FIG. 11 is diagram for explaining a processor in accordance with the second embodiment.

FIG. 12 is a flowchart showing the processing by which the bus switch control information is generated in the second embodiment.

DETAILED DESCRIPTION OF EMBODIMENTS

Figure 1:
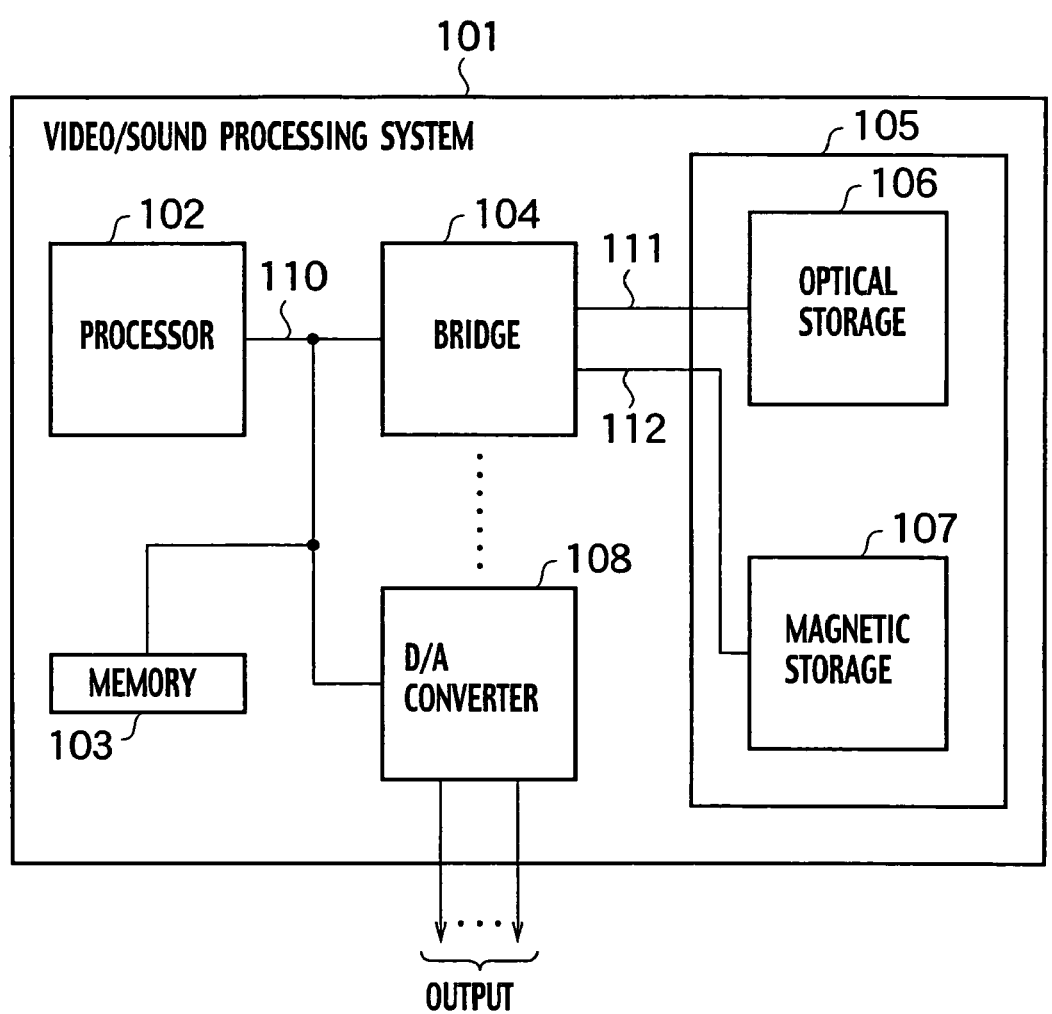
FIG. 1 is a block diagram showing a video/sound processing system according to an embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

(First Embodiment)

FIG. 1 is a block diagram showing a video/sound processing system according to an embodiment of the present invention. This video/sound processing system 101 has a processor 102, a memory 103, a bridge 104, a storage device 105, and a video D/A converter 108. The processor performs data management and data processing. In this embodiment, in order to strengthen the security function, the processor 102 rearranges the signals associated with the data when data is to be outputted to a destination outside the processor. The processor 102 is connected to a local bus 110 and sends and receives data through the local bus 110. The memory 103 is also connected to the local bus 110 and functions to hold data temporarily. The bridge 104 is connected to the local bus 110 and to drive connection buses 111, 112 and serves as an interface between the local bus 110 and the drive connection buses 111, 112. The storage device 105 stores video, sound, and other content. The storage device 105 includes an optical storage device 106 and a magnetic storage device 107. The optical storage device 106 is a CD-ROM, a DVD-ROM, or other device that handles optical storage media. The magnetic storage device 107 is a hard disk drive (HDD) or the like. These storage devices are connected to the bridge 104 by dedicated signal lines, i.e., drive connection buses 111, 112. It is also acceptable to change the data format of, e.g., compress, the video and sound content stored in the optical storage device 106 and magnetic storage device 107 both for the purpose of reducing the total volume of the content and the purpose of making it impossible to play back the video and sound content from the data format in which the content is stored. Furthermore, the video/sound processing system 101 is not limited to handling video and sound content only; rather it can handle any of the various types of content that can be stored in the storage device 105.

Next, playback of video and sound content by the video/sound processing system of this embodiment will be described. First, in response to an instruction issued by the processor 102, content stored in the storage device 105 is forwarded to the bridge 104 through the drive connection buses 111, 112 and on to the memory 110 through the local bus 110. At this stage, the information of the content forwarded to the memory is in the same state as the content stored in the storage device 105, which is generally compressed. The processor 102 executes data processing on the information of the content in the memory and translates it into video information and sound information that can be played back. In this embodiment, the processor 102 rearranges the bits of the data. The information translated by the processor 102 into information that can be played back as video and sound is temporarily stored in the memory 103 through the local bus 110 and then forwarded to the video/sound D/A converter, where the digital information is converted to analog information and the analog information is outputted as video/sound output.

Figure 2:
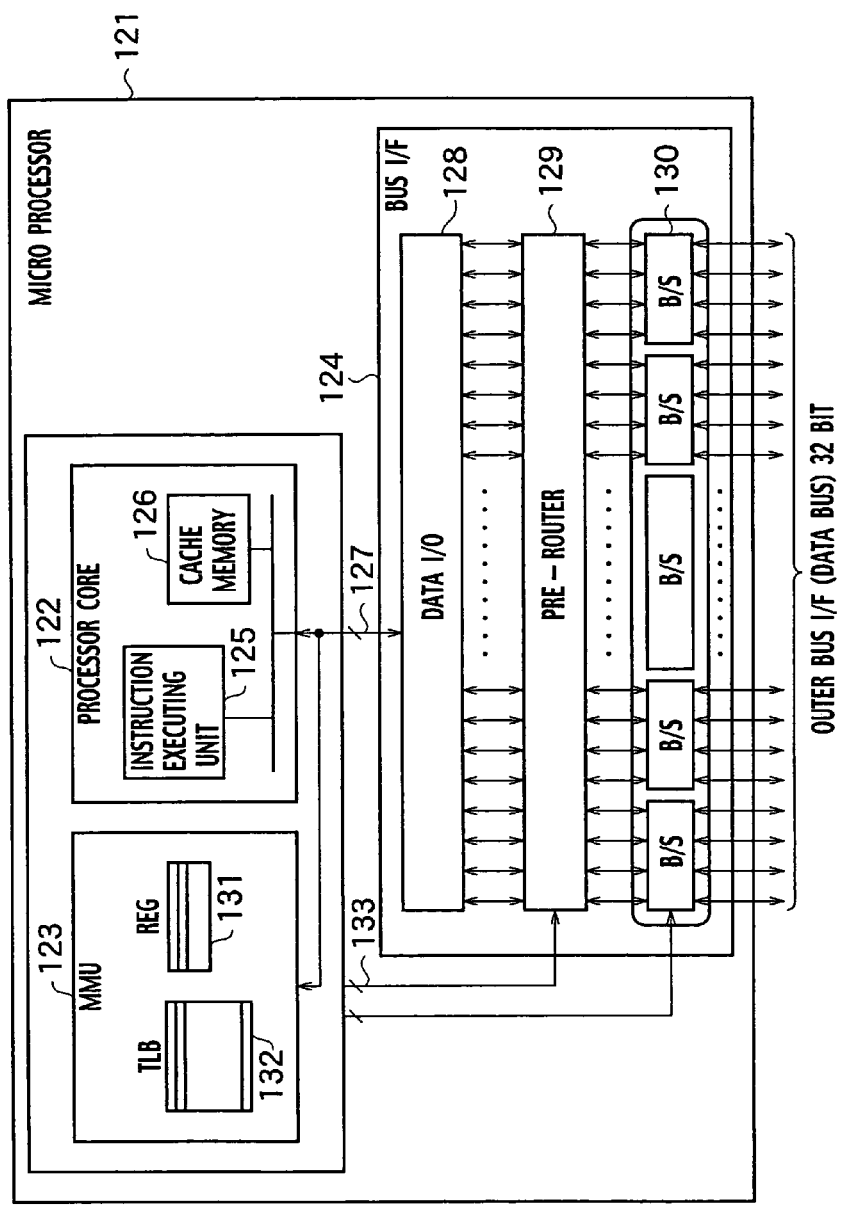
FIG. 2 is a block diagram showing the microprocessor of this embodiment.

FIG. 2 is a block diagram showing the microprocessor of this embodiment. The microprocessor 121 has a bus interface 124 that is connected to an external memory and provided with a data bus shuffle mechanism. This embodiment will be described under the assumption of a 32-bit data bus. The microprocessor 121 includes a processor core 122, a memory management unit (MMU) 123, and an external bus interface unit 124. The processor core 122 includes an instruction executing unit 125 that executes instructions for data input/output control and data processing and a cache memory 126 that stores data temporarily. When it is necessary to access the memory connected to the external bus interface in order for the instruction executing unit 125 to fetch an instruction, for the instruction executing unit 125 to execute a load instruction or store instruction, or for the cache memory 126 to cast out some data (save unneeded entry information to the external memory), the access information is sent to the external bus interface 124 through the internal data bus 127. Here, "casting out" refers to the rewriting of excess data from the cache memory back to the external memory.

Thus, when the memory connected to the external bus is accessed through the external bus interface unit 124, data travels through the external bus interface unit 124 regardless of the direction in which it is being sent. The external bus interface unit 124 includes a data input/output unit 128 that serves to exchange data with the processor core 122 and the memory management unit 123, a switching circuit (hereinafter called "pre-router") 129 that serves to shuffle the data bus signals, and a bus switch 130. Although the bus switch 130 is a 4-bit bus switch in this embodiment, it is not limited to this size and any bit width can be used as appropriate in accordance with cost and other requirements.

Now the pre-router (switching circuit) 129 will be described. The pre-router 129 functions to shuffle the bits of the data signals traveling between the external bus interface and the internal data bus 127. In another word, the pre-router 129 changes the order of bits of the data. The pre-router 129 may changes bits of the data per a bit. The shuffling performed by the pre-router 129 is controlled based on information stored in a pre-router register 131 in the MMU 123. This information is called "pre-routing information." The pre-routing information includes information that indicates the connection state of the signals of the data bus of the external bus interface and the signals of the data bus of the internal bus interface.

Figures 3, 4:
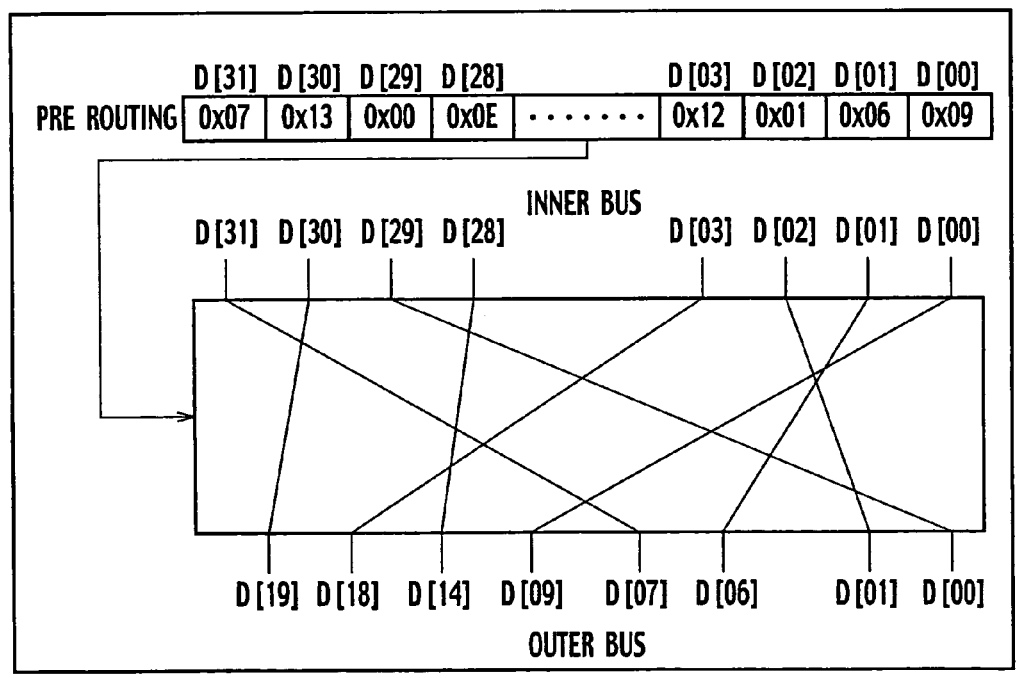
FIG. 3 shows an example of the format of the pre-routing information stored in the pre-router 129.
FIG. 4 illustrates an example of the pre-router connections in a case where the pre-routing information shown in FIG. 3 is used.

FIG. 3 shows an example of the format of the pre-routing information stored in the pre-router 129. As shown in the figure, when the data bus of the external bus interface has 32 bits, the pre-routing information includes 160 bits so that 32 5-bit parameters can be stored. The 5-bit parameters are used to assign a specific number in place of the name of each signal line of the 32-bit external data bus.

For example, the hexadecimal number 0x00 might be assigned to the D[0] signal of the external data bus and, similarly, the hexadecimal number 0x1F might be assigned to the D[31] signal. Using such a method as this, each bit of the internal data bus can be associated with the bit of the external data bus to which it is connected.

FIG. 4 illustrates an example of the pre-router connections in a case where the pre-routing information shown in FIG. 3 is used. The example connections will now be described in detail using the figure. To determine the bit of the external data bus that is connected to the D[31] bit of the internal data bus, look at parameter number 31 of the pre-routing information. Since the value of the 5-bit parameter is 0x07, the corresponding bit of the external data bus is D[07]. Similarly, since the value of parameter number 30 of the pre-routing information is 0x13, the bit of the external data bus that is connected to the D[30] bit of the internal data bus is D[19]. The remaining pairs of corresponding bits are matched in the same manner. The pre-routing information is sent from the pre-router register 131 to the pre-router through the pre-router control line 133 at the stage when an external address is actually accessed. In actual practice, it is also possible to provide the processor with a plurality of pre-routing registers. In such a case, a feasible method of selecting which pre-routing information will be used is to use information in the high-order portion of the address that will be accessed.

Figure 5:
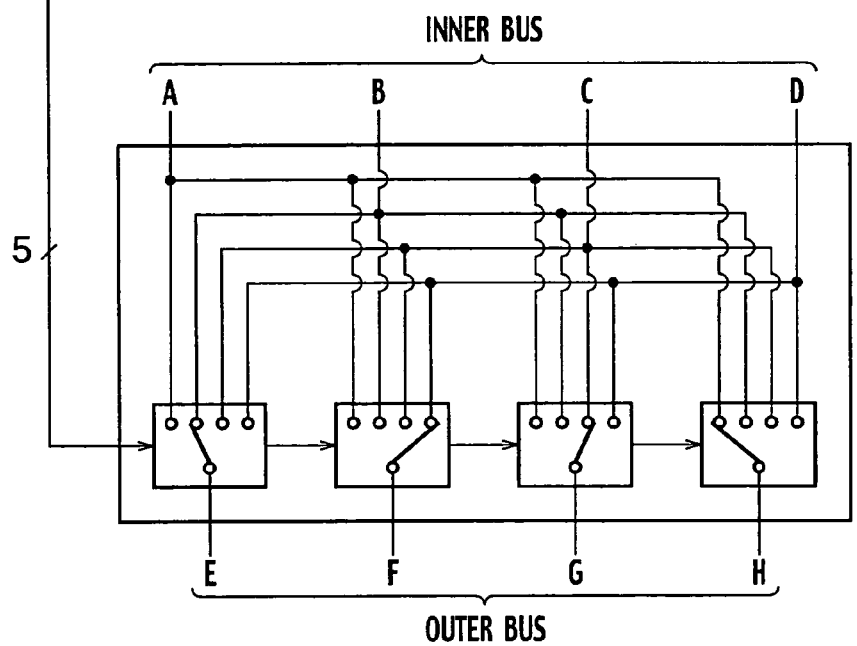
FIG. 5 shows the 4-bit bus switch 130 of this embodiment.

FIG. 5 shows the 4-bit bus switch 130 of this embodiment. The bus switch can have any number of bits, but this embodiment illustrates an example in which four bits are used. The bus switch receives a part of the signals from the pre-router 129 and rearranges the received signals. The bus switch may receive the signals per a page managed by the MMU 123.

The purpose of the bus switch is to make it more difficult to ascertain the configuration of the data from the outside by shuffling, per a page, information passes through the bus interface unit. The 32-bit data bus is divided into units of four bits and a 4-bit bus switch is provided for each of these units. Thus, a 32-bit data bus requires eight 4-bit switches. The 4-bit bus switches can freely change the connection relationship between four bits of the internal bus (more precisely, the pre-router) and the corresponding four bits of the external bus.

Bus switch control information is provided to control the connection relationship between the signals connected to the 4-bit bus switches. It is also acceptable to provide separate control signals for each bus switch in order to increase the degree of data shuffling. In the embodiment shown in FIG. 5, the 4-bit bus switch has four switch units. Each switch unit operates based on the bus switch control information. In this embodiment, the bus switch control information is made up of five bits. The reason a 5-bit parameter was selected is that the four bits of the switch can be arranged into a total of 24 combinations of four bits and a 5-bit parameter can express the 24 combinations.

Figure 6:
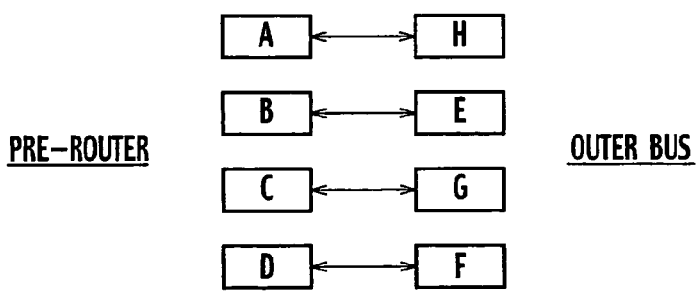
FIG. 6 shows the correspondence between the bus switch control information and the connection scheme.

FIG. 6 shows the correspondence between the bus switch control information and the connection scheme. The 4-bit bus switch shown in FIG. 5 connects signals A, B, C, and D of the internal bus (pre-router) with signals E, F, G, and H of the external data bus such that signal A is connected to signal H, signal B is connected to signal E, signal C is connected to signal G, and signal D is connected to signal F.

FIG. 7 is a table showing the correspondence between the bus switch connection schemes and the bus switch control information parameters. In the table, each line (horizontal direction) shows the connection scheme corresponding to a particular bus switch control information. In the "A" column (vertical direction) of the bus switch connection scheme section of the table, the letters E, F, G, and H indicate which signal of the external bus is connected to the A signal of the internal bus (pre-router) when a particular bus switch control information is issued. In FIG. 5, the bus switch control information is the hexagonal number 0x19. FIG. 7 indicates that this value corresponds to a connection scheme in which signal A is connected to signal H, signal B is connected to signal E, signal C is connected to signal G, and signal D is connected to signal F, which matches the situation illustrated in FIG. 5. In this way, the bus switch shown in FIG. 5 is connected based on the table shown in FIG. 7.

When the external bus is a 32-bit data bus, eight 4-bit bus switches are required. Since there are eight bus switches, there are eight signals of the bus switch control information for controlling the bus switches. Thus, the bus switch control information is a 40-bit signal (5 bits×8=40 bits). In order to manage the switching patterns of the bus switches on a per-page basis, the switching patterns are stored in each entry of the TLB (table lookaside buffer) 132, which constitutes the address conversion cache memory of the MMU (memory management unit) in this embodiment.

Figure 8:
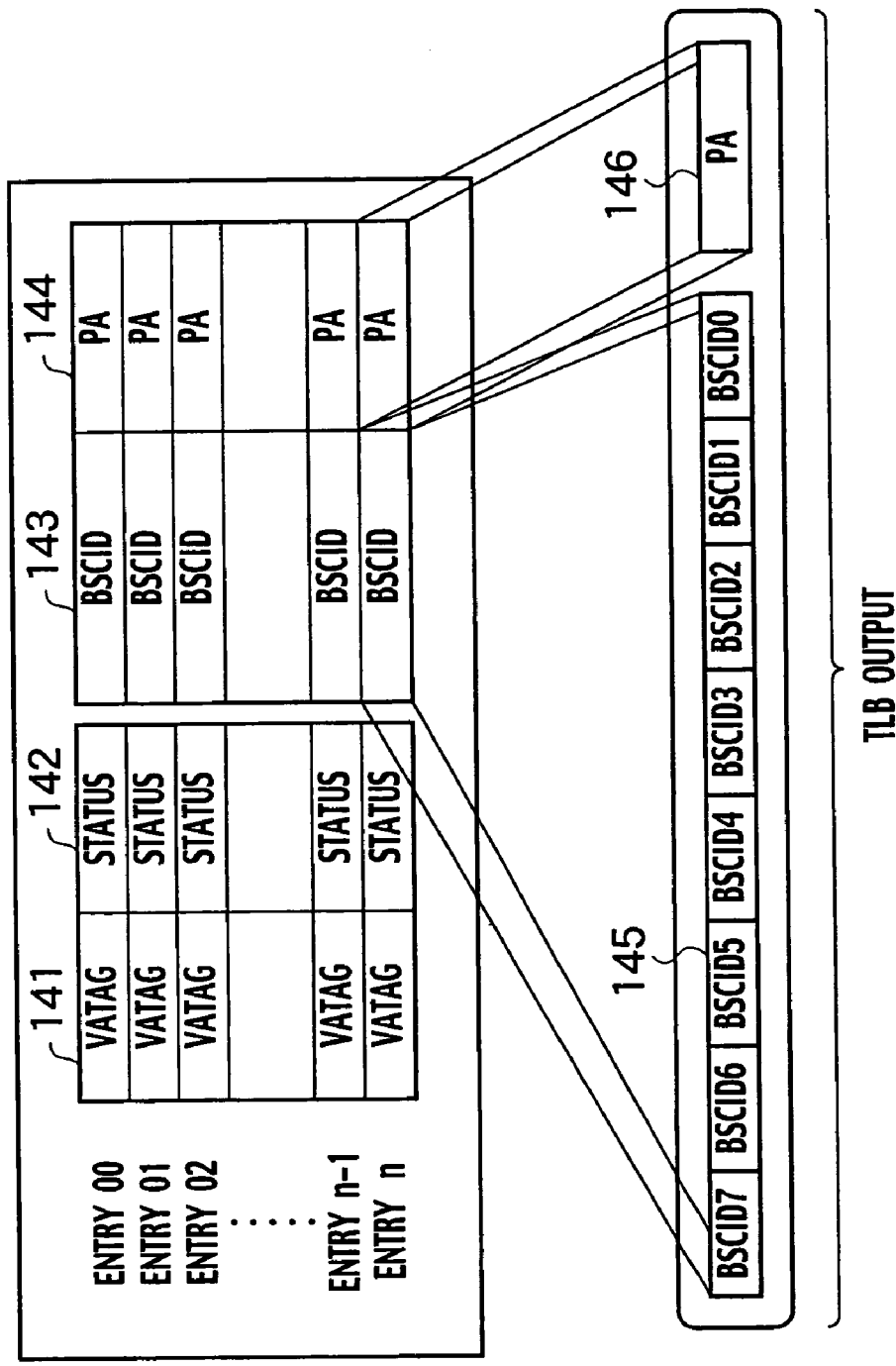
FIG. 8 shows an example of the structure of the TLB in this embodiment.

FIG. 8 shows an example of the structure of the TLB in this embodiment. The mechanisms of the TLB will now be described. The TLB is one of the cache memories that stores translation reference information for translating addresses called "virtual addresses" generated inside the processor into physical addresses that can actually be used in a physical manner.

A section of the TLB that stores a set of information is called an entry. Basically, information called a virtual address tag, which is for comparing with a virtual address, is stored in each entry. If the content of a virtual address and a virtual address tag match, the translation reference information of the matching entry is used to generate a physical address. The address tags described here are indicated in the VATAG 141 of FIG. 8 and the translation reference information is indicated in the PA (physical address substitution information storage unit) 144 of FIG. 8. Each entry of the TLB also includes information indicating the size of a region called a "page" and status information 142 that designates an access limit.

In this embodiment, each entry of the TLB is provided with a bus switch control information storage unit 143 so that the connection scheme of the switch can be changed on a per-page basis. In this example, which assumes a 32-bit external data bus and the use of 4-bit bus switches, the bus switch control information storage unit 143 includes a 40-bit parameter (5 bits×8 bus switches).

The 40-bit parameters are used to change the connections of the eight 4-bit bus switches based on the table shown in FIG. 7. Immediately after the entry that matches the virtual address is selected, the bus switch control information 145 is fetched as TLB information output simultaneously with the fetching of the physical address high-order information 146 from the physical address substitution information storage unit 144.

This information output is not forwarded to the external bus interface immediately. For example, if only the data cache memory is being accessed for writing, the bus switch control information is sent to the cache memory alone and not forwarded to the bus switches. In short, the cache memory, too, requires the ability to store the bus switch control information.

Figure 9:
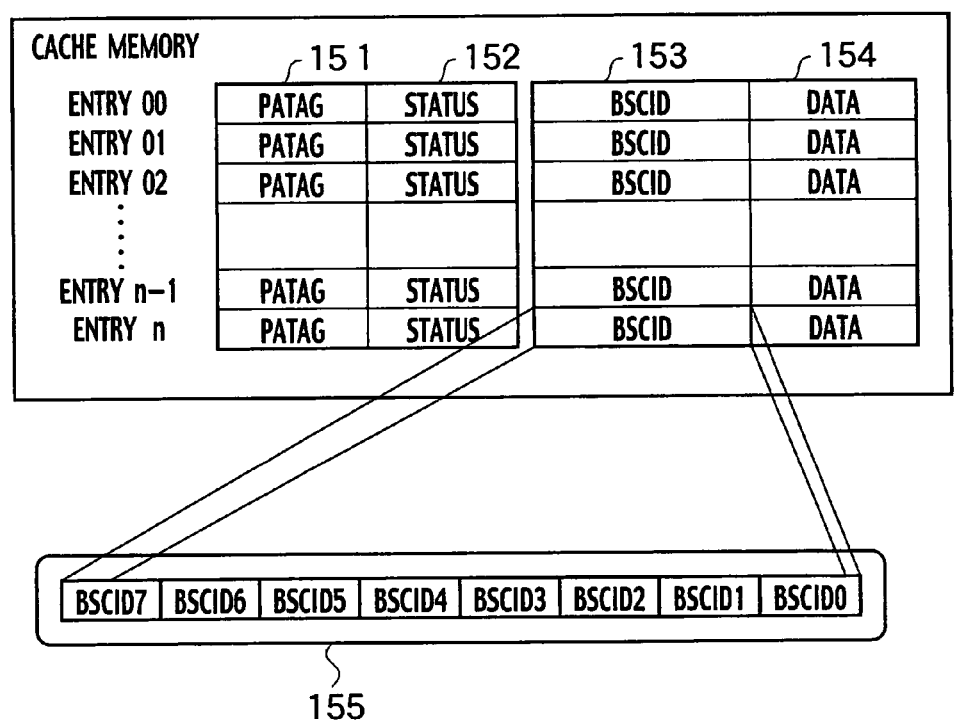
FIG. 9 illustrates an example of the structure of the TLB in this embodiment.

FIG. 9 illustrates an example of the structure of the TLB in this embodiment. This cache memory has a physical address comparison information storage unit 151, a status information storage unit 152, a bus switch control storage unit 153, and a data storage unit 154.

When the external bus interface is accessed from inside the processor, the bus switch control information is sent as is from the TLB 132 to the bus switches inside the external bus interface and data shuffling is conducted. When data stored in the cache memory is cast out (i.e., when the available space in the cache memory is used up and some of the data in the cache is discharged to the external bus and rewritten to an external memory), the data to be cast out and its address values, as well as the bus switch information stored in the cache, are sent to the external bus interface. When this occurs, the data being cast out is shuffled.

It is feasible for the bus switch control information to be either defined by some method by a programmer or generated automatically by the hardware. In either case, once the bus switch control information for a page has been defined, it cannot be changed unless the operation of the processor itself is stopped and initialization is conducted by cutting power to the processor or performing a hardware reset. If the bus switch control information is changed while the processor is in operation, the value written before the control information was changed cannot be read correctly after the control information is changed. Therefore, in a system installed with a processor in accordance with this embodiment, once the bus switch control information has been generated, the same bus switch control information is used for as long as the system operates without interruption.

Figure 10:
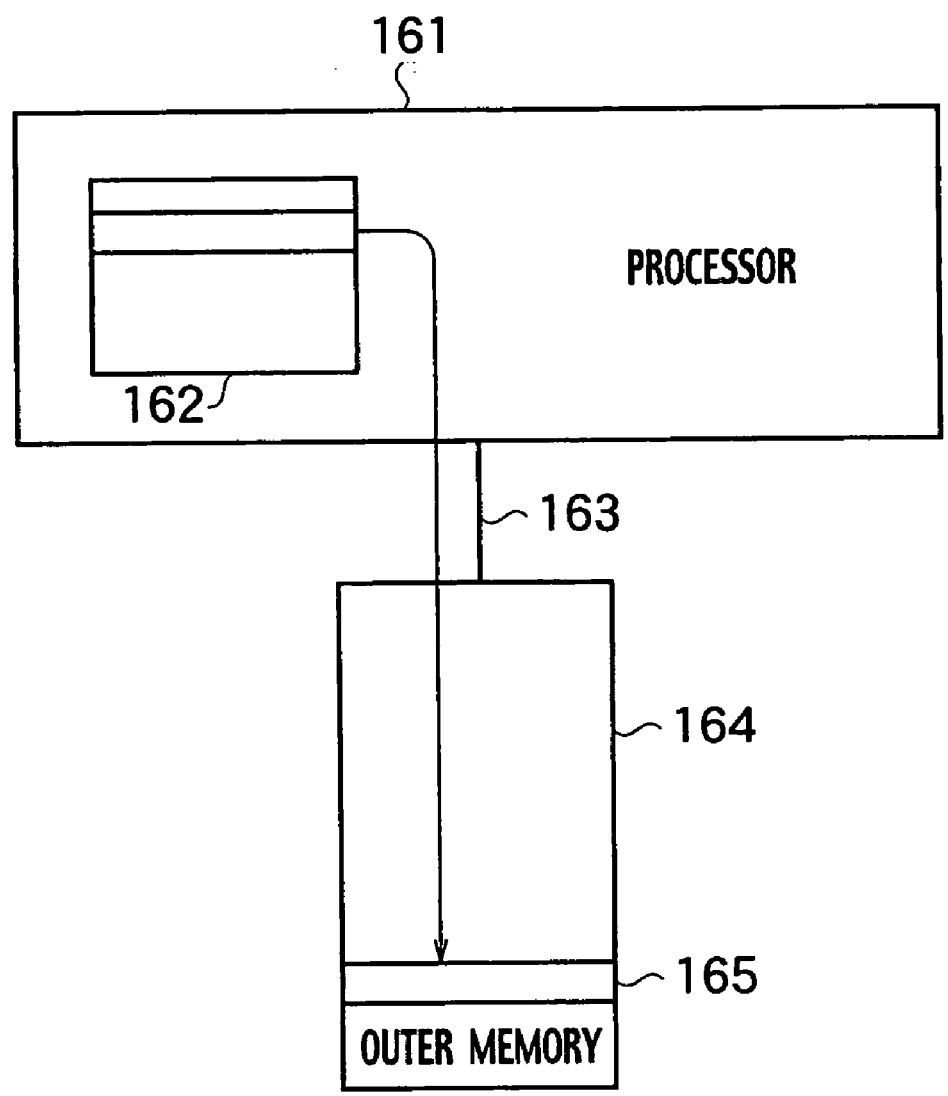
FIG. 10 illustrates the storage of TLB information and bus switch control information in an external memory.

FIG. 10 illustrates the storage of TLB information and bus switch control information in an external memory. Here, when bus switch control information stored in he TLB 162 of the processor 161 is discharged from an entry of the TLB 162, it passes through the external bus 163 and is stored a memory region 165 of the external memory 164. At the same time, the entry information of the TLB is also stored in the external memory. The TLB entry information and bus switch control information combined forms the page table information.

(Second Embodiment)

In the first embodiment, a processor is described which changes the shuffle pattern on a per-page basis by means of the data signal line shuffling mechanism of a pre-router and the combination of bus switches and a TLB. With this processor, there is a possibility that the bus switch control information, which constitutes shuffle pattern information, can be analyzed because the bus switch control information is sent to the external bus interface. Therefore, in a second embodiment, a processor will be presented in which the degree of concealment of the shuffling mechanism is increased by using a method in which the bus switch information is not sent to the external bus, thus enabling the security effect to be increased.

FIG. 11 is diagram for explaining a processor in accordance with the second embodiment. The TLB 171 is different from the TLB of the first embodiment in that bus switch control information is not stored in each entry. The bus switch control information is stored in a dedicated bus switch control information storage unit 174. Each bus switch control information is stored in the entry of this unit. Below, this embodiment is described for a case in which the unit has n entries.

The n entries of the bus switch control information storage unit 174 are numbered from 0 to n-1. Based on a value provided from the outside, a single entry is selected and the bus switch control information is outputted.

In this embodiment, the value provided from the outside is actually a portion of the physical address information of a TLB entry selected during address translation work that used the TLB. In other words, based on the value (having a value from 0 to n-1) of a portion of the physical address information of one TLB entry selected during address translation work, an entry in which bus switch control information is stored is selected from the bus switch control information storage unit.

The processing flow of a processor in accordance with this embodiment will now be described using FIG. 11. When an external physical memory is accessed from inside the processor, first the generated address (virtual address) is compared with the VATAGs inside the TLB 171, which constitute the virtual address comparison information storage unit that exists inside the entries of the TLB 171. The entry whose VATAG is found to match the virtual address is selected. Assuming the selected entry 172 is the entry (K-2), the PA stored in the physical address substitution information storage unit of that entry is fetched from the TLB 171 and a portion of the physical address high-order information 173, namely PA[Q:R], is forwarded to a prescribed storage region 175 of the bus switch control information storage unit 174. If the value of PA[Q:R] is 0xS, then the entry [S] 175 is selected from the entries of the bus switch control information storage unit 174. The bus switch control information stored in the selected entry [S] is fetched and sent to the cache memory or the external bus interface.

The bus switch control information sent to the cache memory is not used immediately to control the bus switches. Instead it sits there until, for whatever reason, the processor shifts to such processing as rewriting some data stored in the cache memory to a memory connected to the external bus. Then, the bus switch control information stored in the cache memory along with the data is used to control the bus switches.

By thus establishing a correlation between the access address value and the bus switch control information and not outputting the bus switch information to the outside, the concealment of the shuffling mechanism is improved and the security effect can be increased.

FIG. 12 is a flowchart showing the processing by which the bus switch control information is generated in the second embodiment. The processing will now be explained using the flowchart, where n is the number of bus switch control information entries. First, the power switch is turned on or the hardware is reset such that the processor enters the initial state (step S181), and the processor waits for release of the hardware reset (step S182). When the hardware reset is released, the initial value 0 is set for a prescribed bus switch control information entry number (E) (step S183). Then a random value is generated as the bus switch control information (step S184) and the bus switch control information is written to that entry (step S185). Next, the entry number (E) is changed (step S186) and the processor determines if the $n^{th}$ bus switch control information entry has been reached (step S187). If the $n^{th}$ bus switch control information entry has not been reached, then the processor returns to step S184. Meanwhile, if the $n^{th}$ bus switch control information entry has not been reached, then the processor ends the registration of bus switch control information (step S188) and ends the processing.

The bus switch control information stored in the bus switch control information storage unit 174 is generated as random values and stored in the bus switch control information storage unit each time the hardware reset of the processor is executed or the power to the processor is turned on. The bus switch control information then stays in the bus switch control information storage unit waiting to be used. Since the bus switch control information is generated as random values, it is set to different values each time the power is turned on or the reset is executed. Consequently, the repeatability of accessing the external bus with the same bus switch shuffling patterns is eliminated. As a result, analysis of the external bus interface information can be made more complex and the security of the content can be increased.

With the processor of this embodiment, even if the plurality of memory data signal lines (plurality of bits) are ascertained, the data format of the content and the processing details cannot easily be analyzed based on the data traveling through the bus because the memory signal lines are shuffled. As previously explained, by providing a function for rearranging the signal lines of the data bus, this embodiment makes it difficult to analyze the signals of the data bus of a processor used to process images, sound, or other content that involves copyrights. This embodiment thus makes it difficult to break the security of the content and makes it possible to provide a higher level of protection for the content.

In summary, those embodiments can provide a video/sound processing system having a microprocessor and a security function that can protect the content of media and the like at a high level.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A microprocessor comprising:
   a processor core including an instruction executing unit configured to execute instructions for input and output controlling and processing for data and a cache memory configured to store the data;
   a memory management unit coupled to the processor core, the memory management unit configured to manage memory system including the cache memory, the memory management unit comprising
      a pre-routing storing unit configured to store pre-routing information that indicates the connection state of signals of a switching circuit, and
      an address translation buffer configured to store virtual tag information for translating virtual addresses generated inside the processor into physical addresses, each of the virtual tag information is stored by an entry and corresponds to bus switch control information for controlling a connection relationship of a bus switch; and
   a bus interface coupled to the processor core and the memory management unit, the bus interface configured to rearrange an order of bits of the data transferred from the processor core, the bus interface comprising
      a data input/output unit coupled to the processor core and memory management unit, the data input/output unit configured to receive and send the data,
      the switching circuit coupled to the data input/output unit, the switching circuit configured to receive the data to change the order of the bits of the data according to the pre-routing information, and
      the bus switch coupled to the switching circuit and configured to receive the data and change the order of the bits per a predetermined number of the bits according to the bus switch control information corresponding to an entry in the address translation buffer.

2. The microprocessor as claimed in claim 1, wherein the switching circuit changes connection state of signals according to the pre-routing information to change the order of bits.

3. The microprocessor as claimed in claim 2, wherein the pre-routing information is transferred from the memory management unit to the switching circuit when the data is to be outputted to a destination outside the processor.

4. The microprocessor as claimed in claim 3, wherein the switching circuit changes the order of bits of the data per a bit.

5. The microprocessor as claimed in claim 1, wherein the bus switch changes connection state of signals based on bus switch control information to change the order of bits of the data.

6. The microprocessor as claimed in claim 5, wherein the bus switch control information is stored by the memory management unit.

7. The microprocessor as claimed in claim 1, wherein the bus switch changes the order of bits per a page managed by the memory management unit.

8. The microprocessor as claimed in claim 5, wherein the memory management unit stores the bus switch control information in each entry of the address translation cache memory.

9. The microprocessor as claimed in claim 5, wherein the bus switch control information is stored by an entry of the cache memory in the processor core.

10. The microprocessor as claimed in claim 7, wherein the bus switch receives the bus switch control information when an external address is accessed by the processor then the bus switch changes the order of bits of the data based on the bus switch control information.

11. The microprocessor as claimed in claim 1, wherein the memory management unit includes a bus switch control information storing unit storing the bus switch control information, the memory management unit transfers the bus switch control information corresponding to a physical address stored in the address transfer cache memory when an external address is accessed by the processor.

12. A video/sound processing system comprising:
   a storage device configured to store content;
   a bridge coupled to the storage device, the bridge configured to transfer the content stored by the storage device;
   a microprocessor including
      a processor core including an instruction executing unit configured to execute instructions for input and output controlling and processing for data and a cache memory configured to store the data
      a memory management unit coupled to the processor core, the memory management unit configured to manage a memory system including the cache memory, the memory management unit comprising
         a pre-routing storing unit configured to store pre-routing information that indicates the connection state of signals of a switching circuit, and
         an address translation buffer configured to store virtual tag information for translating virtual addresses generated inside the processor into physical addresses, each of the virtual tag information is stored by an entry and corresponds to bus switch control information for controlling a connection relationship of a bus switch, and a bus interface coupled to the processor core and the memory management unit, the bus interface configured to rearrange bits of the data transferred from the processor core, the bus interface comprising
    a data input/output unit coupled to the processor core and memory management unit, the data input/output unit configured to receive and send the data,
    the switching circuit coupled to the data input/output unit, the switching circuit configured to receive the data to change an order of the bits of the data according to the pre-routing information, and
    the bus switch coupled to the switching circuit and configured to receive the data and change the order of the bits per a predetermined number of the bits according to the bus switch control information corresponding to an entry in the address translation buffer;

a memory coupled to the bridge, the memory configured to temporarily hold the rearranged content from the microprocessor; and a D/A converter coupled to the memory, the D/A converter configured to convert the transferred content to analog data.

13. The video/sound processing system as claimed in claim 12, wherein the switching circuit changes connection state of signals according to the pre-routing information to change the order of bits of the content.

14. The video/sound processing system as claimed in claim 13, the pre-routing information is transferred from the memory management unit to the switching circuit when the content is to be outputted to a destination outside the processor.

15. The video/sound processing system as claimed in claim 12, wherein the switching circuit changes the order of bits of the content per a bit.

16. The video/sound processing system as claimed in claim 12, wherein the bus switch changes connection state of signals based on bus switch control information to change the order of bits of the content.

* * * * *